Sept. 8, 1959  L. H. MORIN  2,902,783
LABELED PLASTIC SPOOL
Filed Jan. 18, 1955  2 Sheets-Sheet 1
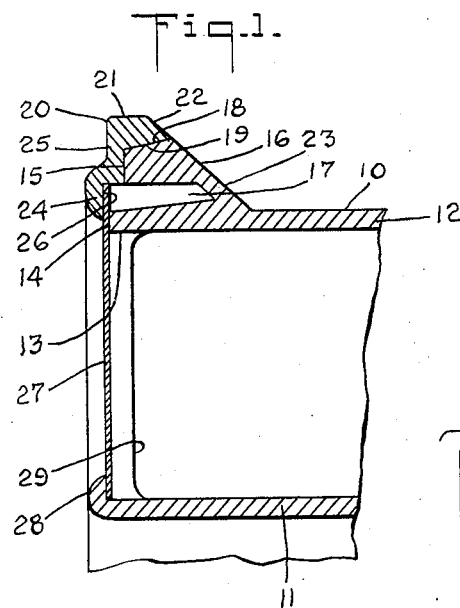
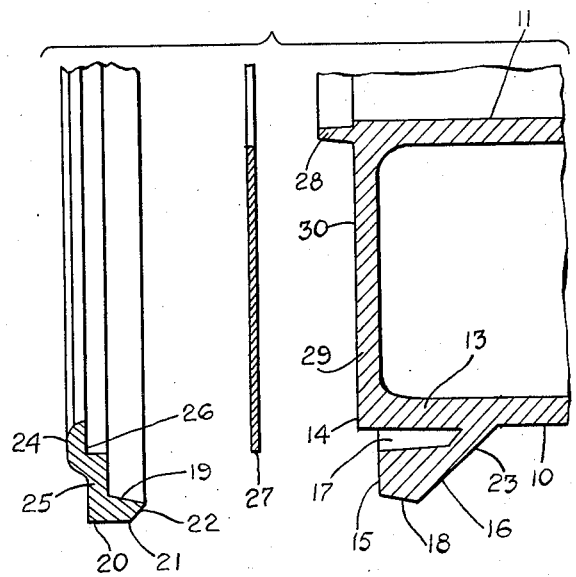
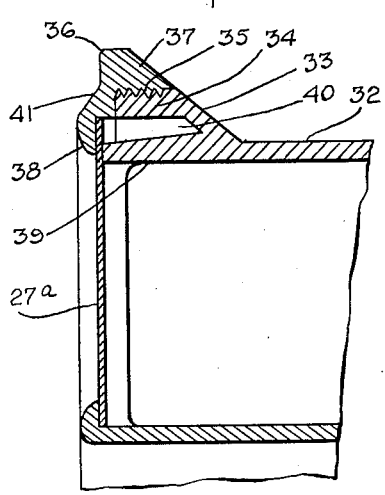
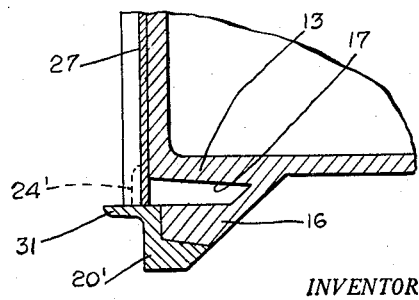
INVENTOR.
LOUIS H. MORIN
BY
*Howard E. Thompson*
ATTORNEY.

Sept. 8, 1959   L. H. MORIN   2,902,783
LABELED PLASTIC SPOOL
Filed Jan. 18, 1955   2 Sheets-Sheet 2
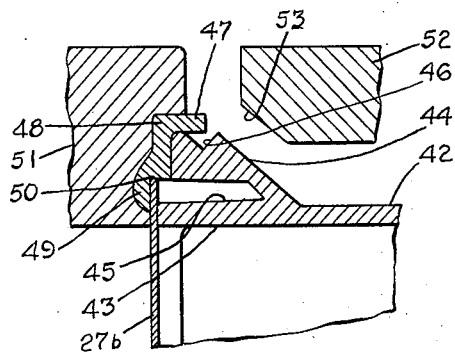
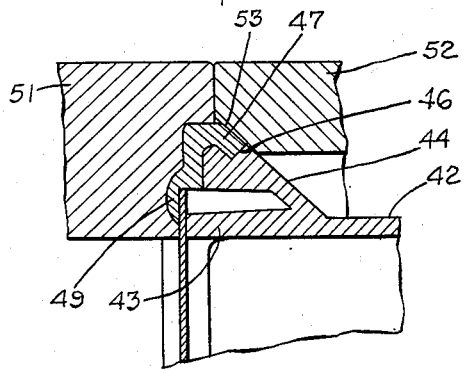
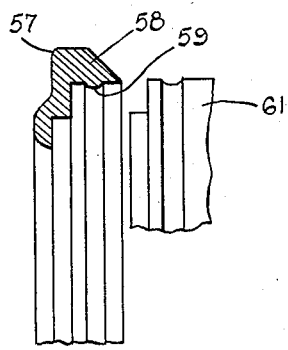
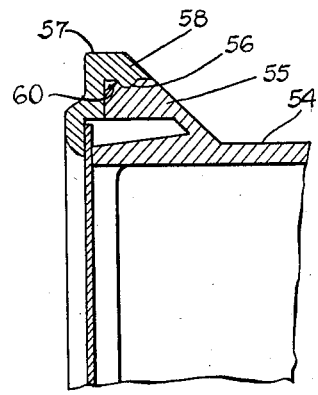
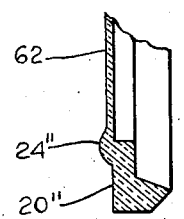
INVENTOR.
LOUIS H. MORIN
BY
ATTORNEY.

() # United States Patent Office 2,902,783
Patented Sept. 8, 1959

2,902,783

LABELED PLASTIC SPOOL

Louis H. Morin, Bronx, N.Y., assignor to Coats & Clark Inc., New York, N.Y., a corporation of Delaware Application January 18, 1955, Serial No. 482,462

3 Claims. (Cl. 40—10)

This invention relates to moulded plastic spools, wherein labels are attached to end portions of the spools by pre-formed moulded plastic rims. More particularly, the invention deals with spool structures of the kind described, wherein the rims include annular flanges extending onto end portions of the spool and secured thereto in retaining labels upon the ends of the spool.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an enlarged sectional view of part of one end portion of a spool, illustrating a label attached thereto by the use of a pre-formed rim.

Fig. 2 is an exploded view, showing the spool end, label and rim in alined but spaced relationship to each other, preparatory to assembling the parts in producing the result shown in Fig. 1 of the drawing.

Fig. 3 is a detailed sectional view of a spool, similar to that shown in Figs. 1 and 2, and illustrating a modified form of rim, as well as indicating the method of attaching the label by said rim.

Fig. 4 is a view, similar to Fig. 1, showing a modified method of attaching the rim to the spool.

Fig. 5 is a detailed sectional view of a modified form of spool and rim, indicating a die structure for supporting and shaping the rim.

Fig. 6 is a view, similar to Fig. 5, showing the formation of the rim in attaching the same to the spool.

Fig. 7 is a sectional detailed view of a modified form of rim which I employ, illustrating one die part for forming the rim in spaced relation thereto.

Fig. 8 is a sectional detailed view of a spool assemblage, incorporating the rim shown in Fig. 7 of the drawing, and Fig. 9 is a sectional detailed view of a rim, similar to the rim shown in Figs. 1 and 2 of the drawing, and showing a modification.

This application is a continuation-in-part of my prior application, Serial No. 442,140, filed July 8, 1954.

In Figs. 1 and 2 of the drawing, I have shown one adaptation of my invention and, in said figures, 10 represents part of one end portion of a moulded plastic spool, 11 represents a portion of the center tube of the spool, and 12 the barrel portion. Continuous with the barrel portion is an annular extension 13, having an outer surface 14, which extends beyond the corresponding outer surface 15, of an annular peripheral portion 16 at the rim end of the spool body. Between the extension 13 and portion 16 is an annular space 17 which is subdivided by a series of spaced ribs (not shown). It will also appear that the annular portion 16 has a peripheral tapered or bevelled surface 18, upon which a correspondingly formed surface 19 of a rim 20 is adapted to seat and be cemented or otherwise adhesively secured thereto.

The surface 19 of the rim 20 constitutes the inner surface of an annular inwardly extending flange 21 of the rim and the inner end of this flange has a bevelled surface 22, which is in alinement with the bevelled surface 23 of the peripheral portion 16. This peripheral portion 16 may be said to comprise an enlargement upon the end of the spool barrel arranged in spaced relation from the extension 13.

The rim 20 also includes an outer annular label retaining piece or member 24, which joins the flange 21 in a wall portion 25. The retaining piece or member 24 is offset outwardly with respect to the wall portion 25 to form a label receiving recess 26 on the inner surface of the retaining piece or member 24. It will appear from a consideration of Fig. 1 of the drawing that the retaining piece or member 24 is of sufficient inside diameter to overlie at least part of the end surface 14 of the extension 13, so as to bear a label 27 arranged in the recess 26 upon the surface 14.

In the construction shown, the label 27 is ring-like in form to fit over the tube 11 and the outer end of this tube has a flange 28 which is adapted to be spun-over the label in retaining the inner diameter of the label against displacement.

In Fig. 2 of the drawing, the spool 10, rim 20 and label 27 are illustrated in spaced, alined relationship to each other, preparatory to arranging the label on the end of the spool and attaching the rim to the spool. In this figure, the section through the spool 10 is taken through one of a number of radial ribs 29 at the spool end, outer surfaces 30 of these ribs being disposed in alinement with the end surface 14 of the extension 13. These ribs 29 are additional means for backing up the label 27 when mounted upon the end of the spool. In Fig. 2, the flange 28 is shown in its extended position, preparatory to the curling operation. The parts, when brought together, and the rim, when cemented in position, will produce the result shown in Fig. 1 of the drawing.

In Fig. 3 of the drawing, I have shown a modified form of rim 20' which differs from the rim 20 simply in providing an outwardly extending flange portion 31 thereon, which is later spun-over in producing a retaining piece or member 24', as indicated in dotted lines in Fig. 3, said retaining piece 24' being generally similar to the retaining piece 24 shown in Fig. 1 of the drawing. Otherwise, the structure of Fig. 3 is identical with the structure in Fig. 1 of the drawing and like references will designate like parts.

In Fig. 4 of the drawing, I have shown a modified form of spool 32, wherein the peripheral portion or enlargement 33, generally similar to the enlargement 16, has its flange portion 34 threaded, as seen at 35, to receive corresponding threads on the rim 36 or the flange portion 37 thereof. At 38 is shown an annular label retaining piece or member, similar to the member 24, which overlies the extension 39 of the spool, similar to the extension 13. At 40 is shown the annular space, similar to the space 17, and at 41 is shown the label receiving recess, similar to the recess 26, in which the label 27a is adapted to seat. Otherwise, the spool structure of Fig. 4 is the same as that shown in Figs. 1 and 2 of the drawing. It will here be apparent that, instead of cementing or adhesively securing the rim in place, the rim 36 has a threaded engagement, as at 35, with the flange 34.

In Figs. 5 and 6 of the drawing, I have shown another adaptation of my invention and, in these figures, 42 represents another form of spool having an extension 43, similar to the extension 13, an annular peripheral portion or enlargement 44, similar to the enlargement 16, an annular recess 45, similar to the space 17. The extension or enlargement 44 differs from the enlargement 16 in having an annular V-shaped recess 46 at its outer peripheral edge, which is adapted to receive the flange 47 of a rim 48, the rim otherwise being generally similar to the rim 20, shown in Figs. 1 and 2 of the drawing. In other words, the rim 48 has a label retaining piece or member 49, similar to the member 24, inwardly of which is a recess 50, similar to the recess 26, for receiving the label 27b.

In Figs. 5 and 6, I have shown at 51 and 52 two forming tools, the tool 51 serving to back up the rim 48 in the manner shown; whereas, the tool 52 is preferably heated and has a bevelled surface 53, which is adapted to engage the flange 47 in shaping the flange to extend into the recess 46, in the manner shown in Fig. 6 of the drawing.

In Figs. 7 and 8 of the drawing, I have shown a modified form of spool and rim construction, the spool being shown only in Fig. 8 and designated by the reference character 54. The spool is substantially identical with the structure shown in Figs. 5 and 6, except that the groove, formed in the peripheral portion or enlargement 55, is in the form of an annular shallow recess 56 at the peripheral portion of the enlargement. The rim 57 differs from the rim 48 in providing, on the annular flange portion 58 thereof, an inwardly extending annular bead 59, which is adapted to spring into the recess 56 in securing the rim 57 on the end of the spool. It will be noted, from a consideration of Fig. 8, that the enlargement 55 has, at its outer corner, a bevelled wall portion 60 which facilitates movement of the bead 59 over the enlargement 55 in springing into the recess 56. In this connection, it will be understood that the plastic material employed in the rim will be of such characteristics as to facilitate the springing action defined.

In Fig. 7 of the drawing, I have shown at 61 a part of the core or mould used in shaping the rim 57 and have illustrated the same in spaced relation to the rim to illustrate that, after the moulding operation and by virtue of the spring characteristics of the material in the rim, the rim can be sprung from the mould or core 61.

In Fig. 9 of the drawing, I have shown a modified form of rim 20" which differs from the rim shown in Figs. 1 and 2 of the drawing in being made from transparent plastics and in providing a label retaining piece or member 24", which, includes an integral thin wall portion 62, the latter forming a protective facing for the label, when the rim is arranged upon and secured to a spool end.

In the latter figures, no detailed description is given to the several parts of the spool and rim for the reason that, aside from the modified structures described, the spools and rims are otherwise similar to previous showings.

With the various spool structures shown, the spool body includes an annular enlarged peripheral portion, with which the pre-formed rim is secured in the operation of finishing the rim end of the spool body and also in securing labels in position. These pre-formed rims can be produced of materials contrasting to the materials employed in moulding the spool body proper, not only from a standpoint of color, but also from the standpint of the type of plastic material employed. In some instances, the spool body can be composed of an inexpensive material; whereas, the rims can be a more expensive material. In some cases, transparent rims are employed, as for example, the showing in Fig. 9 of the drawing.

By this method of procedure, it will be apparent that the spool bodies proper can be produced in mass production; whereas, the rims of different colors or other characteristics will be made to meet specification requirements and, quite often, these rims are made in close similarity to or harmonizing with the color of the thread or strand wound around the spool. It will further be apparent that, with the method as disclosed, the rims and labels are attached to the spool ends in a single operation, thus dispensing with independent handling in the attachment of labels.

Having fully described my invention, what I claim as new and desire to secure by Letters Patent is:

1. In a plastic thread spool, the improved means for holding an end ticket label on the spool comprising a pre-formed plastic rim mounted on an end portion of the spool, said rim having an inwardly extending annular flange, an outer annular label-retaining piece having an outer surface and an inner surface, and a label-receiving recess on the inner surface of said piece, said spool having at said end portion thereof an annular peripheral portion engaged by the annular flange of the rim, an annular extension on said end portion of the spool of a smaller diameter than said annular peripheral portion, a ticket label seated on the end of said extension and maintained thereon by said retaining piece, and means for securing the annular flange of the rim to the said annular peripheral portion of the spool.

2. A plastic thread spool having improved means for holding an end ticket label on the spool comprising a preformed plastic rim mounted on an end portion of a spool body; said rim having an annular flange extending longitudinally inwardly thereof and, radially inwardly of said annular flange, an annular label retaining piece; said spool body having at said end portion thereof an integral annular peripheral rim portion engaged by the annular flange of said rim, and an integral annular extension on said end portion of the spool body of a smaller diameter than said annular peripheral portion; a separate ticket label disposed at the end of said annular extension and maintained thereat by said retaining piece; and means for securing the annular flange of the rim to the said peripheral rim portion of the spool body to thereby form said spool.

3. The spool of claim 2 in which a plurality of circumferentially spaced, plastic-saving, weight-reducing, end-opening recesses are disposed in said spool body intermediate said annular extension and said annular peripheral rim portion.

References Cited in the file of this patent

UNITED STATES PATENTS

| | | |
|---|---|---|
| 492,657 | Bohringer | Feb. 28, 1893 |
| 611,343 | Tilden | Sept. 27, 1898 |
| 1,028,877 | Herrick | June 11, 1912 |
| 1,140,868 | Bennett | May 25, 1915 |
| 1,528,985 | Odquist | Mar. 10, 1925 |
| 1,958,840 | Baker | May 15, 1934 |
| 1,970,506 | Womeldorff | Aug. 14, 1934 |
| 2,000,372 | Beck | May 7, 1935 |
| 2,343,389 | Stahl | Mar. 7, 1944 |
| 2,431,238 | Friedman | Nov. 18, 1947 |
| 2,527,519 | Bliss | Oct. 31, 1950 |

FOREIGN PATENTS

| | | |
|---|---|---|
| 534,172 | Germany | Sept. 23, 1931 |